Figures 3, 4, 5:
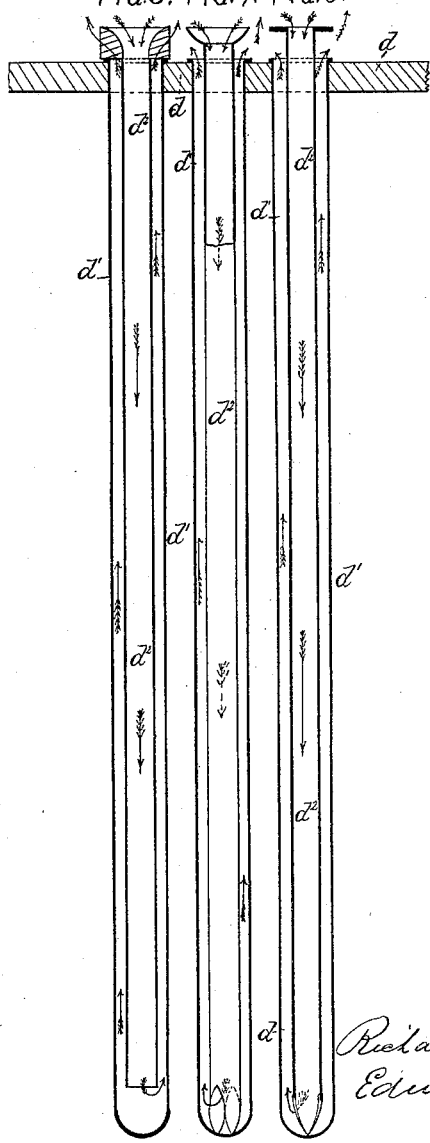

6 Sheets Sheet 1.
M. & R. M. Merryweather & E. Field,
Steam-Boiler Water-Tube.
N°. 44,877. Patented Nov. 1, 1864.
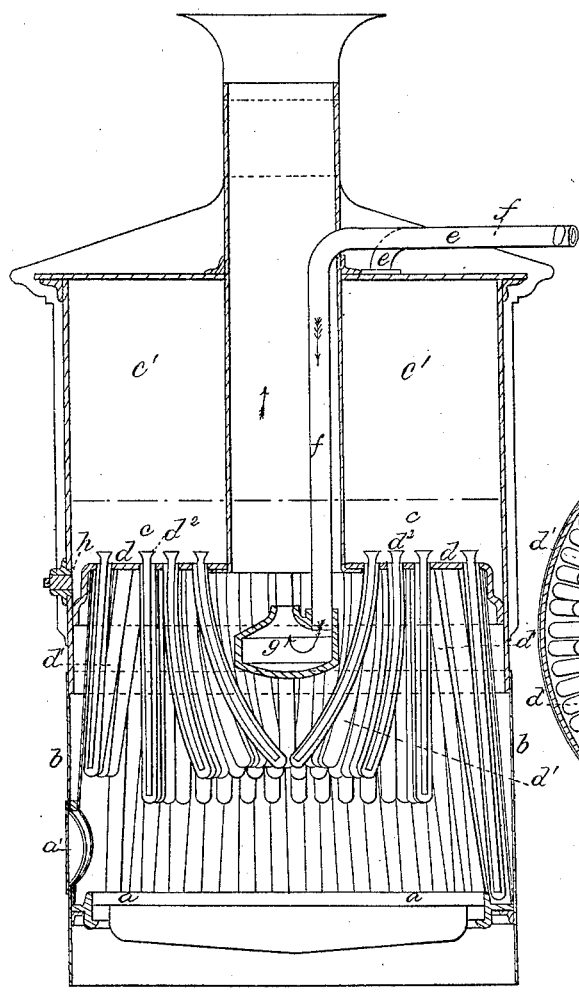
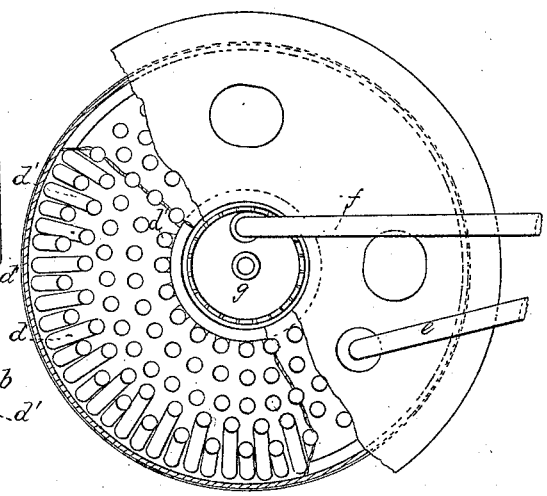
Witnesses:
W. Lloyd Wise
  Adelphi London
James Parker
  London
Inventor:
Moses Merryweather
Richard Moses Merryweather
Edward Field

M. & R. M. Merryweather & E. Field,
Steam-Boiler Water-Tube.
No. 44,877. Patented Nov. 1, 1864.

Witnesses:
W. Lloyd Wise
  Adelphi London
James Parker
  London

Inventors:
Moses Merryweather
Richard Moses Merryweather
Edward Field

6 Sheets–Sheet 4.

M. & R. M. Merryweather & E. Field,
Steam-Boiler Water-Tube.

No. 44,877. Patented Nov. 1, 1864.

Witnesses:
W. Lloyd Wise
 adelphi London
James Parker
 London

Inventors:
Moses Merryweather
Richard Moses Merryweather
Edward Field

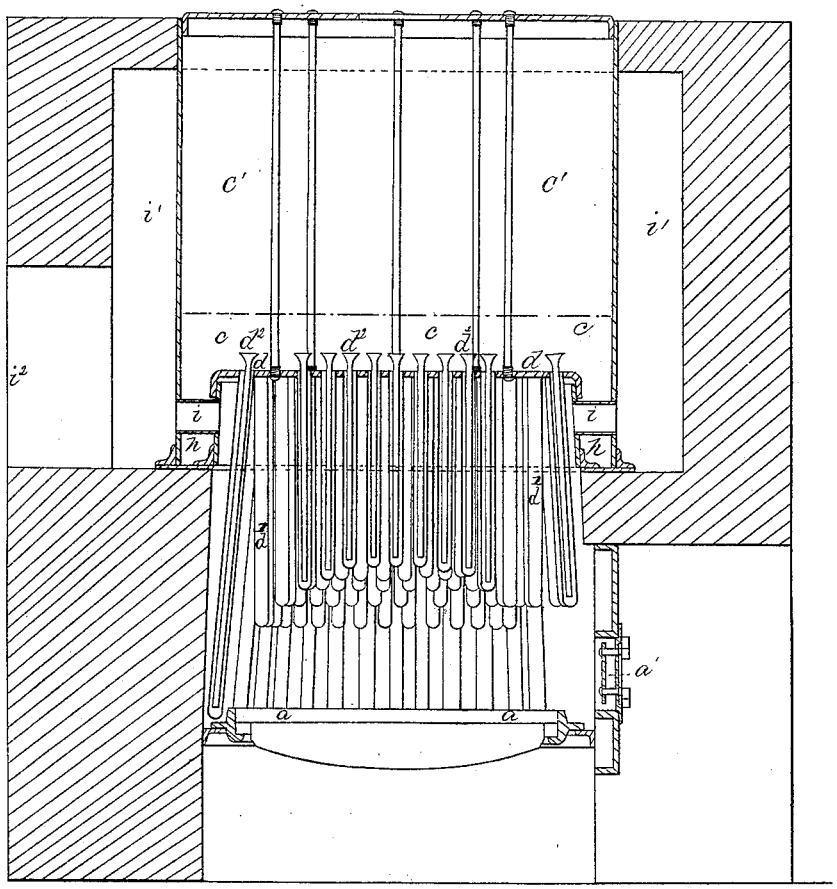

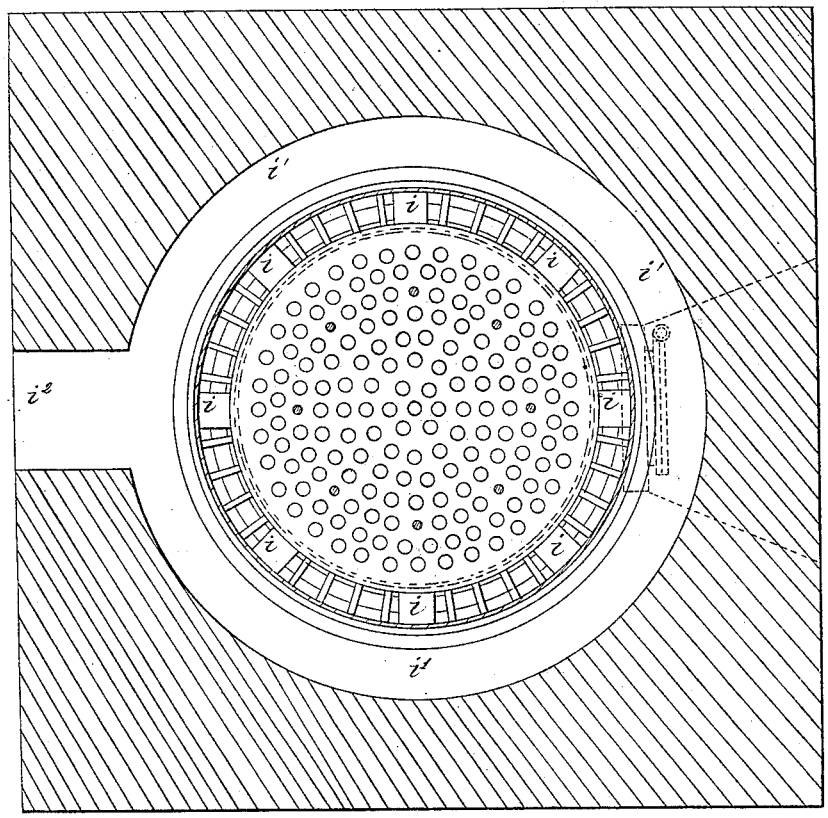

UNITED STATES PATENT OFFICE.

MOSES MERRYWEATHER, RICHARD MOSES MERRYWEATHER, OF LONG ACRE, LONDON, AND EDWARD FIELD, OF LONDON, ENGLAND.

IMPROVED STEAM-GENERATOR.

Specification forming part of Letters Patent No. 44,877, dated November 1, 1864.

*To all whom it may concern:*

Be it known that we, MOSES MERRYWEATHER and RICHARD MOSES MERRYWEATHER, both of Long Acre, London, Kingdom of Great Britain and Ireland, fire-engine manufacturers, and EDWARD FIELD, of Buckingham street, Adelphi, London, Kingdom of Great Britain and Ireland, consulting engineer, have invented certain new and useful Improvements in Steam Boilers and other Apparatus for the Transmission of Heat to Fluids; and we do hereby declare the following to be a full, clear, and exact description of the same, reference being had to the accompanying drawings, and to the letters of reference marked thereon.

The object of this invention is to secure the rapid circulation of the water or other fluids operated upon and during such circulation, to bring every part of it in the most effectual manner under the action of the heat evolved by the furnace. For this purpose we make use of a chamber or vessel for containing the water or other fluid to be heated, from the bottom of which hang or depend into the furnace a series of tubes open at the top to the chamber or vessel, but closed at bottom. Within these tubes are smaller ones, leaving an annular space between themselves and the outer tubes, and open both at top and bottom, for the purpose of separating and guiding the downward and upward currents, as hereinafter explained.

The action of the tubes, when submitted to heat, is as follows: The fluid contained in the annular spaces becoming heated takes an upward movement, that contained in the central tubes at the same time moving downward to supply its space. When the fluid has become, by circulation, sufficiently heated to give off steam or vapor, such vapor, rushing up the annular space, will, if allowed to proceed without deflection, seriously interfere with the current required for the supply of the inner tube, and will, if small tubes be employed, be fatally injurious to the system of double tubes, as has been proved by its previous trial and practical abandonment. In order therefore to surmount this difficulty, we make use of a deflector, whereby the upward current is diverted and spread, so as to leave room for the flow of an uninterrupted and free current down the inner tube. By this means we are enabled to employ tubes of small diameter, and, at the same time, to insure steadiness and rapidity of circulation not otherwise attainable by the action of heat alone. The consequence is that heat is imparted to the fluid heated in a very rapid manner, and that where employed for the generation of steam the results attained, with regard to economy of space, weight, first cost, and other particulars, as compared with those achieved by other boilers, are of a remarkable and most satisfactory character.

In order to enable others skilled in the art to make and use our invention, we will now proceed to describe its construction and operation.

On reference to the accompanying drawings, which form a part of this specification, Figure 1 represents a vertical section of an arrangement applicable to engines for portable purposes—such as steam fire-engines, carriages, vessels, &c.; Fig. 2, a plan partly in section of the same, and Fig. 3 an enlarged section of one pair of the tubes employed.

The grate $a$, fed with fuel through the opening $a'$, is of the ordinary or any other convenient construction, and is inclosed in a casing, $b$, which supports the water and steam space $c\,c'$. From the tube-plate $d$ depend and descend into the furnaces a series of tubes, $d'$, curved or otherwise, as found most desirable for the economical employment of the heat generated in the furnace. These tubes $d'$ contain other tubes, $d^2$, which are notched or otherwise made so as to be freely open at bottom, and are formed with trumpet-mouths, or otherwise equivalently shaped to deflect the steam and water ascending from the annular space contained between the inner and outer tubes, and prevent the interference of the ascending with the descending currents, as previously explained. This deflection of the upward current may be effected by various arrangements, differing more or less from the trumpet mouth described—as, for example, by the use of a dish or cup shaped top to the inner tube, as shown at Fig. 4, or by an annular disk or washer, as at Fig. 5, which are substantially equivalent to, although in our opinion less desirable arrangements than, the trumpet-mouth.

In cases like that of the boiler described, with reference to Figs. 1, 2, and 3, the steam, after passing through and giving motion to the engine, (to which it is conveyed by a pipe, e,) is carried off therefrom by an exhaust-pipe, f, which terminates in a box or chest, g, having an opening situated opposite to the bottom of the chimney, from which opening the steam rushes upward and increases the draft of air through the fire-grate, the lower side or surface of the box or chest acting as a baffle-plate, deflecting the flame and gases, and preventing their too rapid escape up the chimney. The exhaust-steam, passing through the baffle-box or chest g, maintains it at a moderate temperature, and thus prevents its destruction by the flame and gases playing upon it.

The circumference of the tube-plate d is bent downward so as to form an annular pocket, h, for the collection of mud or sediment ejected from the tubes, and which, after settling in the pocket, may be got rid of when required by suitable openings provided for the purpose.

Figure 6:
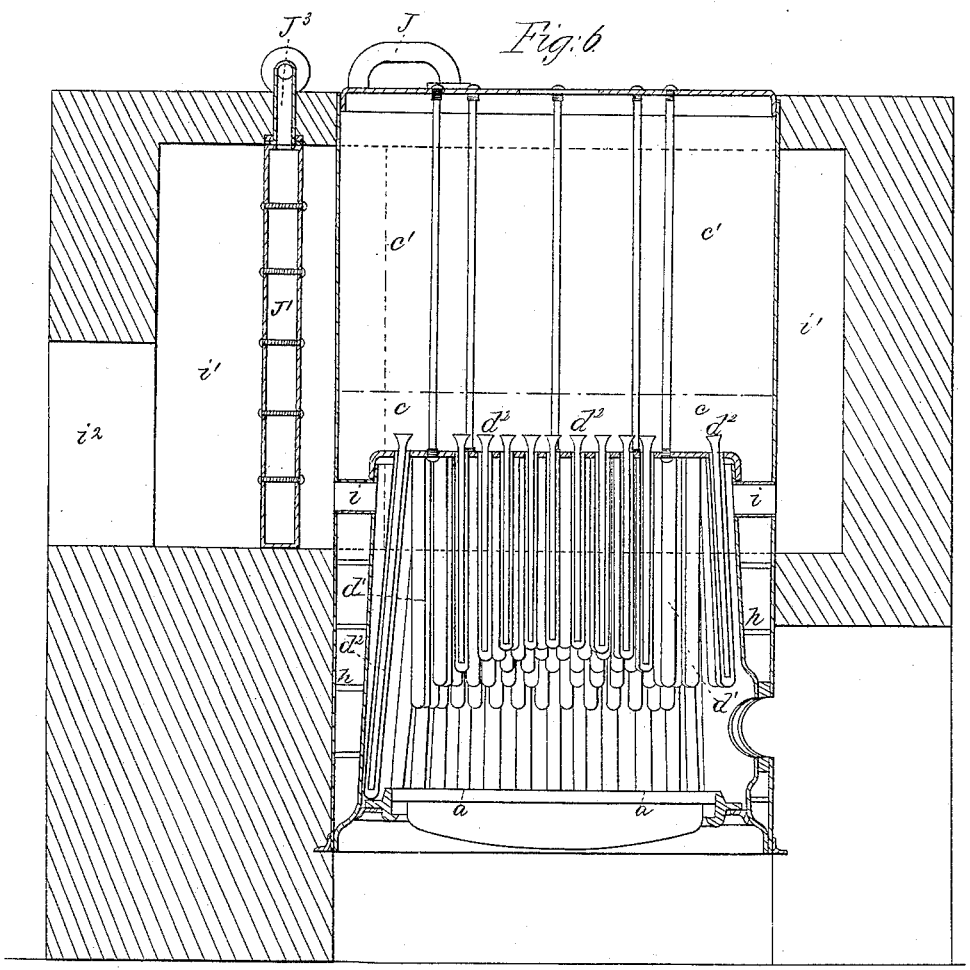
Figure 7:
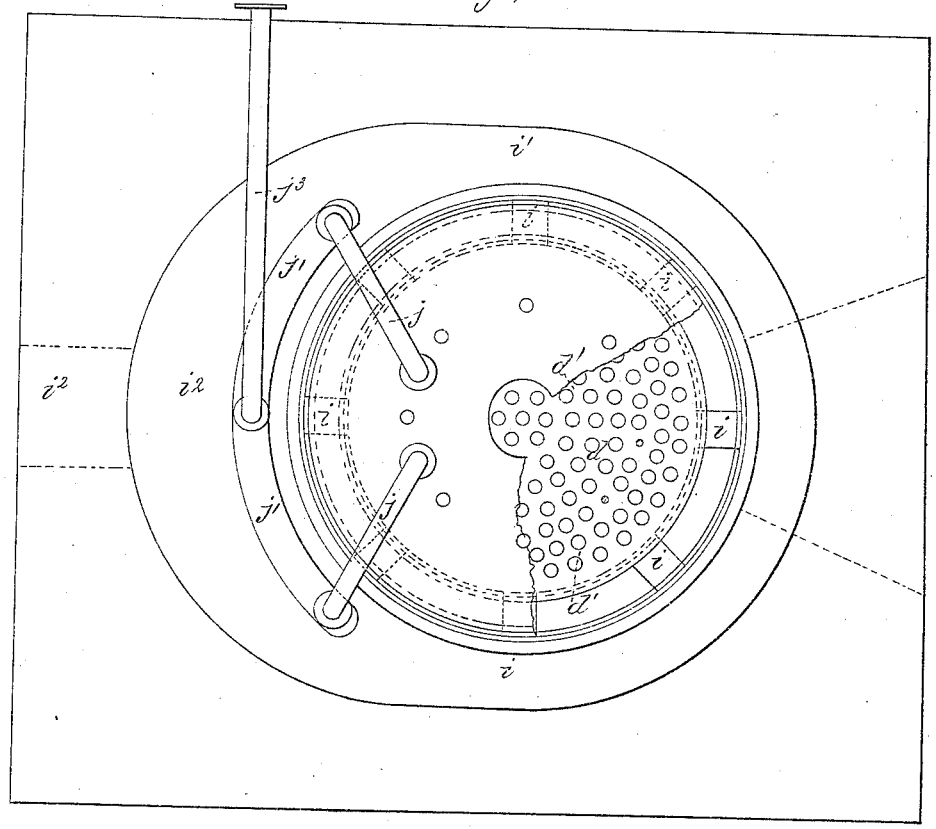

Fig. 6 is a vertical section of a steam-boiler constructed on the same principle as the foregoing, and intended for stationary purposes, and Fig. 7, a plan, partly in section, of the same. In this case the boiler is set in brickwork and is formed with a water-space extending the depth of and entirely surrounding the furnace, the gases from which, instead of being carried off by a central chimney or flue passing upward through the boiler, pass outward through the annular water-space by a series of flue-tubes, i, into the main flue $i'$ communicating with the chimney $i^2$. The steam generated passes by pipes J, as shown, into and through the segmental chamber $J'$, (wherein it becomes superheated,) and passes off to its work by a pipe $J^3$, as shown.

Figs. 8 and 9 are, respectively, a vertical and horizontal section of a boiler, similar in character to the foregoing, but in which the water-space is not, as in that case, continued downward so as entirely to surround the furnace, but terminates a short distance below the tube-plate d, the flame and gases generated by combustion being, as in the foregoing instance, carried off through flue-tubes i into a main flue, $i'$, and thence to the chimney.

The same system of double tubes, the inner tubes having trumpet-mouths, or being otherwise equivalently formed or provided with arrangements for deflecting the upward currents, and insuring steady and sufficient flow for the supply of the downward currents, may obviously be employed in steam-boilers of various other forms, in addition to those represented, and may be employed for numerous purposes besides the generation of steam, and, owing to the rapidity and perfection of the circulation it induces, will be highly economical in fuel. Thus, for example, it may be advantageously employed in apparatus for heating by hot water, for heating brewers' coppers, in distilling apparatus, and in numerous other cases in which it is required to impart heat to fluid or liquid bodies in a rapid and economical manner.

We do not lay any claim to novelty in respect of the mere employment of one tube within another, for the purpose of separating the ascending and descending currents from each other, as such an arrangement had, we are fully aware, been employed prior to the date of our invention; but in no case, we believe, had any arrangement for diverting the upward current of steam and water by a trumpet-mouthed inner tube, or by an equivalent therefor, been made use of.

We do not limit or confine our use or application of tubes as described to steam boilers or hot-water apparatus alone; neither do we limit ourselves to the precise forms of tubes herein delineated; but

We claim—

1. The use or employment (in apparatus employed for treating fluids by double tubes) of trumpet-mouths or other equivalently-formed guides or deflectors, for the purpose of preventing the interference of the ascending and descending currents with each other, and insuring a steady and sufficient circulation through the tubes, substantially as described.

2. The use or employment of a baffle-plate, formed as a box or chest, through which steam is passed, for the purpose of preserving such plate from injury by the flame and gases acting against it, substantially as described.

In testimony whereof we have signed our names to this specification, in the presence of two subscribing witnesses.

MOSES MERRYWEATHER.
RICHARD MOSES MERRYWEATHER.
EDWARD FIELD.

Witnesses:

W. LLOYD WISE,
*Chandos Chambers, Buckingham street, Adelphi, London, W. C.*
GEORGE F. WARREN,
*No. 17 Gracechurch street, London, E. C.*
JOHN HARRISON,
*Notary public, London.*